Patented Oct. 16, 1945

2,387,171

UNITED STATES PATENT OFFICE 2,387,171

PROCESS OF REFINING CRUDE PETROLATUM

John D. Morgan and Angus R. Blakey, South Orange, N. J., assignors to Cities Service Oil Company, New York, N. Y., a corporation of Pennsylvania No Drawing. Application May 11, 1943, Serial No. 486,588

7 Claims. (Cl. 196—21)

This invention relates to the manufacture of petroleum jelly from crude petrolatum. More particularly the invention relates to the selective production of different grades of petroleum jelly from crude petrolatum.

Heretofore petroleum jelly has been made by distilling and filtering crude petrolatum and then passing a partially refined petrolatum through a filtering medium such as bone-black, to modify the color and separately collecting different colored petroleum jellies as they emerge from the filter. This process gives a comparatively low yield of the lighter colored petroleum jellies and involves a comparatively high expense.

The primary object of the present invention is to provide a process of refining crude petrolatum at a low cost.

Another object of the invention is to provide a process of refining crude petrolatum to obtain a high yield at a comparatively low cost.

With these objects in view one feature of the invention contemplates the separation of resins and coloring material from crude petrolatum with an adsorptive agent and the extraction of petrolatum from the adsorption agent with a selective solvent.

Another object of the invention is to provide a process of refining crude petrolatum by adsorption and selective solvent extraction.

A further object of the invention is to provide a process of refining crude petrolatum in which the adsorption is carried out with a series of adsorption agents which are graded in size with the particle size becoming smaller in the direction of movement of the petrolatum through the adsorption material.

A further object of the invention is to provide a process of refining crude petrolatum by adsorption and solvent extraction and the recovery of the solvent and revivification of the adsorption agent for repeated use.

With these and other objects and features in view, the invention consists in the process of refining crude petrolatum hereinafter described and particularly defined in the claims.

In the refining of crude petroleums, particularly paraffin base petroleums, an amorphous waxy material is separated from the lubricating oil stock which is known as crude green petrolatum. This crude green petrolatum is composed largely of a wax from which the petroleum jellies are extracted. The petroleum jelly which brings the best price on the market has a substantially water white color and the lowest priced petroleum jelly contains considerable coloring matter which makes it dark brown or red in color. It is desirable therefore to obtain the maximum amount of water white petroleum jelly from the crude petroleum.

In accordance with the present method the crude green petrolatum is mixed with from one to two volumes of a non-polar hydrocarbon solvent, such as petroleum ether, petroleum naphtha, pentane, or a mixture of pentane and butane. This solvent mixture is heated to a temperature slightly below the boiling temperature of the solvent and then passed through a contact column in which is located a body of adsorption material. The column of adsorption material is heated to substantially the same temperature as the liquid entering the column and as the petrolatum solvent solution passes through the column the adsorption material becomes colored in accordance with the extraction of the materials from the crude petrolatum. The top of the extraction column in which the solution enters becomes dark green while the bottom of the column, which is last wetted by the solution, has substantially no color other than that of the adsorption material. The first extract solution leaving the column is water white and contains the high grade petroleum jelly.

In order to facilitate the adsorption extraction, the column is preferably operated under a comparatively high vacuum and the temperature is governed accordingly to prevent volatilization of the solution solvent. The vacuum is preferably applied at the bottom of the column. In place of a vacuum the adsorption extraction may be carried out by applying pressure to the top of the column.

It has been found to be important to grade the sizes of adsorptive material in the column so that the granular structure varies in a direction of movement of the solvent solution through the column, that is from top to bottom. For example a satisfactory arrangement of the granular adsorption material would be 60 mesh at the top, the next layer being 80 mesh, the third layer being 100 mesh, the fourth layer 150 mesh, and the fifth layer being 200 mesh. Very good results have been obtained in which these five layers are approximately equally divided in a column 36 inches high. Good results have been obtained, however, in which the length of the column has varied from 1 foot to more than 20 feet, this depending upon the amount of material to be treated. It is not necessary to have five different grades because good extraction can be obtained by the use of a comparatively coarse-grained—such as 80 mesh, and a fine grained—such as 150 mesh.

Several different types of adsorption material have been found to give satisfactory results. For example, fuller's earth, clay, bauxite, silica gel and alumina, all have been used effectively in the process. These adsorption agents appear to be catalytic in character and work to good advantage when they have been heated to make them activated. Furthermore it is very advantageous to heat the adsorption agents to free them of moisture before the treatment. Preferably the petrolatum solution should be dried for the adsorption action.

In a column having four layers of graded sizes of adsorption agents, such as acid treated clay or fuller's earth, it has been found that a single passage of the petrolatum solution through the column will produce 20 percent of white petroleum jelly, 30 percent of lemon yellow petroleum jelly, and 50 percent of brown or red petroleum jellies. This separation, however, is not obtained by the adsorption extraction alone because a comparatively small amount, not more than 5 percent of white petroleum jelly, will pass through the adsorption agent in a single pass without solvent extraction. The solvent extraction consists in passing through the column which has approximately 95 percent of the adsorbed petrolatum solution therein, from two to eight volumes of extraction solvent to one volume of crude petrolatum being treated. The extraction solvent is a non-polar solvent such as petroleum ether, pentane, petroleum naphtha, and the like. This passage of the extraction solvent through the catalyst bed is carried out at the same temperature as the adsorption extraction treatment and under the same vacuum or pressure. This selective solvent extraction will produce substantially 20 percent of white petroleum jelly, 30 percent of lemon yellow jelly and 50 percent of red-brown jelly, in one pass through the column of adsorption material four feet thick. With a longer column still higher percentages of white petroleum jelly may be recovered. If the lemon yellow and brown-red jelly extracted are then passed through two to three more columns while separating the white petroleum jelly as it is formed, practically 95 percent of crude petrolatum can be converted into white petroleum jelly by the combined adsorption extraction and the selective solvent extraction.

From 1 to 3 percent of the crude petrolatum remains in the adsorption agent and consists of resins and coloring matter. This mixture of resins and coloring matter may be removed from the adsorption agent by solvent extraction with a polar solvent, such as benzene, alcohol, a water solution of methyl or ethyl alcohol, or water. After two to three volumes of the polar solution per volume of petrolatum treated have been passed through the adsorption agent, it may then be heated to a temperature of 600° F. by passing hot dry gases therethrough by which action it will be revivified and be ready for treatment of new crude petrolatum.

As the refined petroleum jellies emerge from the extraction column they are selectively separated and then distilled to recover the solvents. These solvents are suitable for repeated reuse in the process. When the adsorption agent is treated with a polar solution for the extraction of resins, gums, tars and dyes, the solution preferably is separated from the residue material by distillation and can be repeatedly used in the revivification operation.

The preferred form of the invention having been thus described what is claimed as new is:

1. A process of refining crude petrolatum to separate a series of separate fractions therefrom, comprising diluting the petrolatum with petroleum naphtha, passing the solution into a column of absorption material to separate it into fractions of different color, the dilution of the petrolatum preferably being such that not more than 5% of the diluted mixture will pass through the absorption material as a water white petrolatum-solvent solution, thereafter extracting petrolatum from the adsorption material by passing a petrolatum solvent through the material, separately collecting portions of the petrolatum-solvent solutions being removed from the absorption material in accordance with the color of the portions and separating the solvent from the petrolatum portions by distillation.

2. A process for refining crude petrolatum to produce a series of separate fractions therefrom, which comprises the steps of diluting such crude petrolatum with a non-polar hydrocarbon solvent, passing the solution into a column of adsorption material to separate it into fractions of different color, the dilution of the petrolatum preferably being such that not more than 5 percent of the diluted material will pass through the column as pure white petrolatum, thereafter extracting the petrolatum by passing additional quantities of said non-polar solvent through the column, separately collecting portions of petrolatum solvent solutions leaving the column in accordance with the color thereof, and separating said solvent from such separate portions.

3. The process defined in claim 1 in which the adsorption agent, after the extraction of petrolatum therefrom, is washed with a polar solution of a mixture of water and alcohol to remove resins and the like, and is then heated and dried at a temperature of approximately 600° F. to condition it for reuse.

4. A process for refining crude green petrolatum into a series of separate fractions, which comprises the steps of diluting such crude petrolatum with non-polar petroleum solvent, heating said solution to a temperature which is slightly below the boiling temperature of said solvent, passing the solution into a column of adsorption material to separate it into fractions of different color, the dilution of said petrolatum being such that only about 5% of the diluted material will pass through the column as water-white petrolatum, maintaining said column at substantially the temperature of the introduced mixture, thereafter extracting petrolatum from the adsorption material by passing additional quantities of said non-polar petroleum solvent through the column, separately collecting the different colored fractions of diluted petrolatum leaving the column, and separating the solvent from the separately collected fractions.

5. A process of refining crude petrolatum according to claim 2, further characterized in that the adsorption material is granular and the grains are of different size varying between 80 and 150 mesh, in that the column consists of a series of grains of decreasing size, and in that the petrolatum solution flows through the column in the direction of increasing fineness.

6. A process of refining crude petrolatum according to claim 2, further characterized in that the adsorption material is granular; in that the column thereof consists of layers of grains of different size varying between 80 and 150 mesh; and in that the petrolatum solution flows through the column in such a direction that it first contacts the layer of coarsest grains and then the layers of greater fineness.

7. A process of refining crude petrolatum according to claim 2 further characterized in that the adsorption material is granular, in that the column thereof consists of a series of layers of grains of different size varying between 60 and 200 mesh, and in that the petrolatum solution flows through the column in such a direction that it first contacts the layer of coarsest grains and last the layer of grains of greatest fineness.

JOHN D. MORGAN.
ANGUS R. BLAKEY.